(12) United States Patent
Reytblat

(10) Patent No.: US 8,899,061 B2
(45) Date of Patent: Dec. 2, 2014

(54) ADVANCED MULTI-PURPOSE, MULTI-STAGE EVAPORATIVE COLD WATER/COLD AIR GENERATING AND SUPPLY SYSTEM

(71) Applicant: Mikhail Pavlovich Reytblat, Chandler, AZ (US)

(72) Inventor: Mikhail Pavlovich Reytblat, Chandler, AZ (US)

(73) Assignee: R4 Ventures, LLC, Scottsdale, AZ (US)

( * ) Notice: Subject to any disclaimer, the term of this patent is extended or adjusted under 35 U.S.C. 154(b) by 0 days.

(21) Appl. No.: 13/624,912

(22) Filed: Sep. 22, 2012

(65) Prior Publication Data

US 2013/0075066 A1 Mar. 28, 2013

Related U.S. Application Data

(60) Provisional application No. 61/538,615, filed on Sep. 23, 2011.

(51) Int. Cl.
| | | |
|---|---|---|
| F25D 23/12 | (2006.01) | |
| F28F 13/12 | (2006.01) | |
| F28C 1/08 | (2006.01) | |
| F28C 1/04 | (2006.01) | |
| F28C 1/14 | (2006.01) | |
| F24F 5/00 | (2006.01) | |
| F24F 1/00 | (2011.01) | |
| F28C 1/00 | (2006.01) | |

(52) U.S. Cl.
CPC . *F28F 13/12* (2013.01); *F28C 1/08* (2013.01); *Y02B 30/545* (2013.01); *Y02B 30/748* (2013.01); *F24F 2001/0092* (2013.01); *F28C 1/04* (2013.01); *F28C 1/14* (2013.01); *F28C 2001/006* (2013.01); *F24F 5/0035* (2013.01)
USPC .................. 62/259.4; 62/259.2; 62/310

(58) Field of Classification Search
CPC ............................ F28C 2001/006; F28B 9/06
USPC ............. 62/259.2, 259.4, 314, 407, 157, 178, 62/180, 185, 231, 94, 304, 91, 310; 361/688; 261/153, 147; 165/121, 900, 165/DIG. 182
See application file for complete search history.

(56) References Cited

U.S. PATENT DOCUMENTS

| | | |
|---|---|---|
| 4,831,832 A | 5/1989 | Alsenz |
| 4,951,475 A | 8/1990 | Alsenz |
| 5,265,434 A | 11/1993 | Alsenz |

(Continued)

FOREIGN PATENT DOCUMENTS

| | | | |
|---|---|---|---|
| WO | WO 2009129517 A1 | * | 10/2009 |
| WO | 2011060367 A1 | | 5/2011 |

OTHER PUBLICATIONS

Jia, Jing; Introduction of Heat Recovery Chiller Control and Water System Design; Nov. 6-9, 2006; ICEBO2006, Shenzhen, China; HVAC Technologies for Energy Efficiency, vol. IV-6-2.*

(Continued)

*Primary Examiner* — Allana Lewin
*Assistant Examiner* — Raheena Rehman
(74) *Attorney, Agent, or Firm* — Charles E. Runyan

(57) ABSTRACT

An industrial heat load evaporative cooling system. The system includes multiple cooling towers and includes cooling coil heat transfer equipment locally associated with an industrial heat load, with the system subject to command and control equipment.

6 Claims, 8 Drawing Sheets

(56) References Cited

U.S. PATENT DOCUMENTS

| | | | |
|---|---|---|---|
| 5,460,004 A * | 10/1995 | Tsimerman | 62/94 |
| 5,570,740 A * | 11/1996 | Flores et al. | 165/104.34 |
| 5,571,256 A | 11/1996 | Good | |
| 5,600,960 A * | 2/1997 | Schwedler et al. | 62/99 |
| 5,727,393 A | 3/1998 | Mahmoudzadeh | |
| 6,175,502 B1 | 1/2001 | Schaerer | |
| 6,185,098 B1 | 2/2001 | Benavides | |
| 6,336,957 B1 | 1/2002 | Tsymerman | |
| 6,434,236 B1 | 8/2002 | Zorzella | |
| 6,446,941 B1 * | 9/2002 | Maheshwari et al. | 261/130 |
| 6,553,778 B2 | 4/2003 | Tipton | |
| 6,557,960 B2 | 5/2003 | Shih | |
| D476,324 S | 6/2003 | Tosh | |
| 6,616,524 B2 * | 9/2003 | Storck et al. | 454/184 |
| 6,618,254 B2 | 9/2003 | Ives | |
| 6,845,629 B1 * | 1/2005 | Bourne et al. | 62/304 |
| 6,854,278 B2 * | 2/2005 | Maisotsenko et al. | 62/94 |
| 6,857,711 B1 | 2/2005 | Straus | |
| D514,557 S | 2/2006 | Crisp | |
| 7,062,930 B2 | 6/2006 | Rayburn | |
| 7,214,131 B2 | 5/2007 | Malone | |
| 7,219,505 B2 | 5/2007 | Weber | |
| D545,816 S | 7/2007 | Frank | |
| D545,817 S | 7/2007 | Frank | |
| 7,251,945 B2 | 8/2007 | Tongue | |
| 7,254,022 B2 | 8/2007 | Ebermann | |
| 7,291,792 B2 | 11/2007 | Chang | |
| 7,434,415 B2 | 10/2008 | Knight | |
| 7,507,912 B1 | 3/2009 | Sempliner | |
| 7,510,174 B2 * | 3/2009 | Kammerzell | 261/153 |
| 7,599,184 B2 | 10/2009 | Upadhya | |
| 7,619,887 B2 | 11/2009 | Koch | |
| 7,652,881 B1 | 1/2010 | Sun | |
| 7,694,527 B2 | 4/2010 | Knight | |
| D617,788 S | 6/2010 | Crisp | |
| 7,726,140 B2 | 6/2010 | Rayburn | |
| 7,770,411 B2 | 8/2010 | Knight | |
| 7,813,136 B2 | 10/2010 | Liu | |
| 7,826,230 B2 | 11/2010 | Lee | |
| 7,852,624 B2 | 12/2010 | Sun | |
| 7,891,993 B2 | 2/2011 | Huber | |
| 7,958,854 B2 | 6/2011 | Al-shawaf | |
| 7,992,406 B1 | 8/2011 | Reece | |
| 8,018,724 B2 | 9/2011 | Jian | |
| 8,040,693 B2 | 10/2011 | Blomquist | |
| 8,049,109 B2 | 11/2011 | Sempliner | |
| 8,050,027 B2 | 11/2011 | Liang | |
| 8,050,034 B2 | 11/2011 | Ootani | |
| 8,077,455 B2 | 12/2011 | Jian | |
| 2006/0042295 A1 * | 3/2006 | Assaf | 62/314 |
| 2008/0029250 A1 * | 2/2008 | Carlson et al. | 165/104.33 |
| 2008/0204999 A1 | 8/2008 | Clidaras | |
| 2010/0077776 A1 * | 4/2010 | Takenami et al. | 62/98 |
| 2010/0312498 A1 | 12/2010 | Hamann | |
| 2011/0120693 A1 * | 5/2011 | Kammerzell et al. | 165/201 |
| 2012/0041600 A1 | 2/2012 | Michael | |
| 2012/0057298 A1 | 3/2012 | Wei | |

OTHER PUBLICATIONS

Trane; Water-side Heat Recovery; Feb. 2007; Trane Engineers Newsletter, vol. 36-1.*

* cited by examiner

ADVANCED MULTI-PURPOSE, MULTI-STAGE EVAPORATIVE COLD WATER/COLD AIR GENERATING AND SUPPLY SYSTEM

BACKGROUND

This document introduces a new method and system for a sustainable . . . high-performance . . . low-energy consumption combination of direct and indirect evaporative cooling processes providing maximum cooling at maximum energy efficiency called the Multistage Evaporative Cooling System (MECS). The method and system of the MECS uses a water-into-ambient-air evaporation process.

Water evaporation processes for a variety of comfort and process-cooling needs have existed for many centuries. The most current representative applications of evaporative cooling are the home evaporative air coolers (swamp coolers) and commercial and industrial cooling towers. The cooling apparatuses are relatively simple in design and operation, and they evaporate water directly into ambient air from different types of wet media, which usually have large surface areas. Physics limits the temperature that these cooling apparatuses can achieve when cooling air or water. The wet bulb temperature of the ambient air and the cooling system's design primarily govern the cooling apparatus's low-temperature limit. But regardless of the design of these single stage evaporative cooling apparatuses, the wet bulb temperature of the ambient air is the theoretical absolute low limit for the achievable final temperature of the cooled media (air or water). In other words, under no circumstances can the final temperature of the cooled media for the above apparatuses achieve a value equal to or lower than the ambient air's wet bulb temperature: there will always be some difference between the wet bulb temperature of the ambient air and cold air or water from the apparatus. This temperature difference is defined as an "approach temperature". The approach temperature value varies greatly depending on the cooling apparatus's design. The temperature of the cold air or cold water from the adiabatic cooling apparatus will always be higher than the wet bulb temperature of the entering air being cooled by the apparatus. In other words, the approach temperature of the adiabatic cooling apparatus equals the temperature of the cold water produced by the apparatus minus the wet bulb temperature of the entering air. For general applications of these cooling apparatus, the approach temperature is within a range of 5 to 10° F.

The design of invention embodiments arises from applying engineering principals to discover component arrangements and sequencing of components that result in the ambient air wet bulb temperature barrier being lowered.

Another way of stating the above is as follows. In traditional single-stage direct evaporative cooling, the evaporative cooling process lowers the dry bulb temperature of the processed air (ambient air or a mixture of ambient air and return air), while the wet bulb temperature and enthalpy of the processed air are not changed—they are equal to their initial values. In the single-stage direct evaporative cooling process, the initial wet bulb temperature of the adiabatically processed air is the absolute theoretical temperature limit for the dry bulb temperature of the adiabatically cooled processed air. As stated above, the difference between the dry bulb temperature of the adiabatically cooled air and its wet bulb temperature is known as the "approach temperature".

This principal establishes the following: the lower the approach temperature the higher the efficiency of the adiabatic cooling process. The single stage direct evaporative cooling system/unit is not capable of achieving required temperature levels of cooling media (air or water) that is appropriate for practical use in a majority of demanding cooling applications.

Therefore, there is a strong need for the creation of new universal methods and systems allowing maximum utilization of the laws of thermodynamics related to evaporative cooling applications providing effective and energy efficient evaporative cooling systems for a wide variety of applications by using methods incorporating multiple stages of evaporative cooling.

SUMMARY

The inventor has developed new methods and systems that provide evaporative cooling by combining multiple direct and indirect evaporative cooling stages into one multistage evaporative cooling system to achieve cooling media (air or water) temperatures that are much lower than the initial wet bulb temperature of the ambient air. The Inventor has named this cooling system the Multistage Evaporative Cooling System (MECS: sometimes referred to simply as a cooling system). This new approach and method of the combined multiple direct and indirect evaporative cooling processes fully complies with all laws of thermodynamics by properly sequencing components and actions to achieve maximum cooling at a minimal energy use. The MECS outperforms conventional refrigeration systems by using at least 50% less energy to operate. The MECS's resulting output is cold air, cold water, or both. For some critical cooling applications (for instance, cooling of large volumes of makeup air) at low or moderate ambient air humidity levels, MECS significantly outperforms comparable Conventional Mechanical Refrigeration Systems.

Invention embodiments are drawn to cooling systems with at least two stages. The first-stage cooling assembly includes a forced-draft cooling tower with an air inlet, an air outlet, a cold water reservoir, a variable speed fan, and a variable flow water pump that is adapted to pump cold water through first-stage supply piping. The final-stage cooling assembly includes a forced-draft cooling tower with an air inlet, an air outlet, a cold water reservoir, a variable speed fan, an air-to-water heat exchanger at the air inlet of the final-stage cooling tower and a variable flow water pump that is adapted to pump cold water through final-stage supply piping. This assembly is connected so that cold water produced from operating the first stage can be pumped to a heat exchanger on the final stage (or in some embodiments, another stage) and/or some other cooling load. The heat exchanger cools ambient air as it enters the final stage cooling tower. Ultimately, since the final stage cooling tower operates with air that is colder than the ambient air used by the cooling tower in the first stage, the final stage cooling tower can produce water that is colder than the wet bulb temperature of the ambient air. Various embodiments comprise command and control systems to operate the mechanical components of the cooling system to avoid operating at over capacity or any other operating regime that wastes energy.

Some embodiments include one or more additionally intermediate-stage cooling assemblies that comprises a forced-draft cooling tower with an air inlet, an air outlet, a cold water reservoir, a variable speed fan, an air-to-water heat exchanger at the air inlet of the intermediate-stage cooling tower and a variable flow water pump that is adapted to pump cold water through intermediate-stage supply piping.

Operation of three or more stages has cold water from the first stage cooling air entering an intermediate stage with the final stage air-to-water heat exchangers being fed from one or more intermediate stages allowing even lower cold water temperatures to be reached.

In some embodiments, any of the cooling towers may direct all or some of their cold exhaust air exiting the cooling tower through an energy recovery system that uses an air-to-water heat exchanger and the cold air to create a cold water supply for additional cooling wherever such cooling is needed. The energy recover system is typically operated as a closed loop system.

In some embodiments, the final stage is used to cool various cooling loads such as process cooling loads or cools the make up air flowing through the make up air handling unit for supplying cold air to the building.

Some method embodiments include steps of supplying the cooling stages described above and operating the cooling stages so that the final cooling stage or one or more of the intermediate cooling stages produce cold water with a temperature below the ambient wet bulb temperature of the air used in the cooling process.

In some embodiments, the energy recovery system includes an air inlet adapted to receive cool air from a cool air source, an air-to-water heat exchanger, a fan, a pump, piping connecting from the air-to-water heat exchanger to a cooling load then to the pump and then back to the air-to-water heat exchanger or from the air-to-water heat exchanger to the pump and then to a cooling load and then back to the air-to-water heat exchanger. The energy recovery system uses waste cool air exhaust from a cooling tower in some embodiments.

FIGURES

DETAILED DESCRIPTION

The following description of several embodiments describes non-limiting examples that further illustrate the invention. No titles of sections contained herein, including those appearing above, are limitations on the invention, but rather they are provided to structure the illustrative description of the invention that is provided by the specification.

Unless defined otherwise, all technical and scientific terms used in this document have the same meanings that one skilled in the art to which the disclosed invention pertains would ascribe to them. The singular forms "a", "an", and "the" include plural referents unless the context clearly indicates otherwise. Thus, for example, reference to "fluid" refers to one or more fluids, such as two or more fluids, three or more fluids, etc. Any mention of an element includes that element's equivalents as known to those skilled in the art.

Any methods and materials similar or equivalent to those described in this document can be used in the practice or testing of the present invention. This disclosure incorporates by reference all publications mentioned in this disclosure and all of the information disclosed in the publications.

This disclosure discusses publications only to facilitate describing the current invention. Their inclusion in this document is not an admission that they are effective prior art to this invention, nor does it indicate that their dates of publication or effectiveness are as printed on the document.

The features, aspects, and advantages of the invention will become more apparent from the following detailed description, appended claims, and accompanying drawings.

Exemplary Features of the MECS

The MECS's new methods and systems allows the generation of supply air or cooling fluid, such as water, at a low temperature, meeting the conditioned space's temperature control requirements without adding moisture to the supply air or fluid in most cases.

Design Simplicity (MECS does not need to rely on any high-energy-using refrigeration compressors).

Ecologically sound design (MECS uses only water and atmospheric air—no need to use Freon-type refrigerants such as hydrochlorofluorocarbons (HCFCs)).

Scalability (MECS can be scaled to provide as little as 5 tons to well over 500 tons of equivalent Conventional Mechanical Refrigeration Cooling).

Economical Energy Use (MECS has significantly lower power consumption compared to Conventional Mechanical Refrigeration Systems).

Green Electrical Energy Use (MECS can use green electrical energy sources (solar, wind, etc.).

Figure 1:
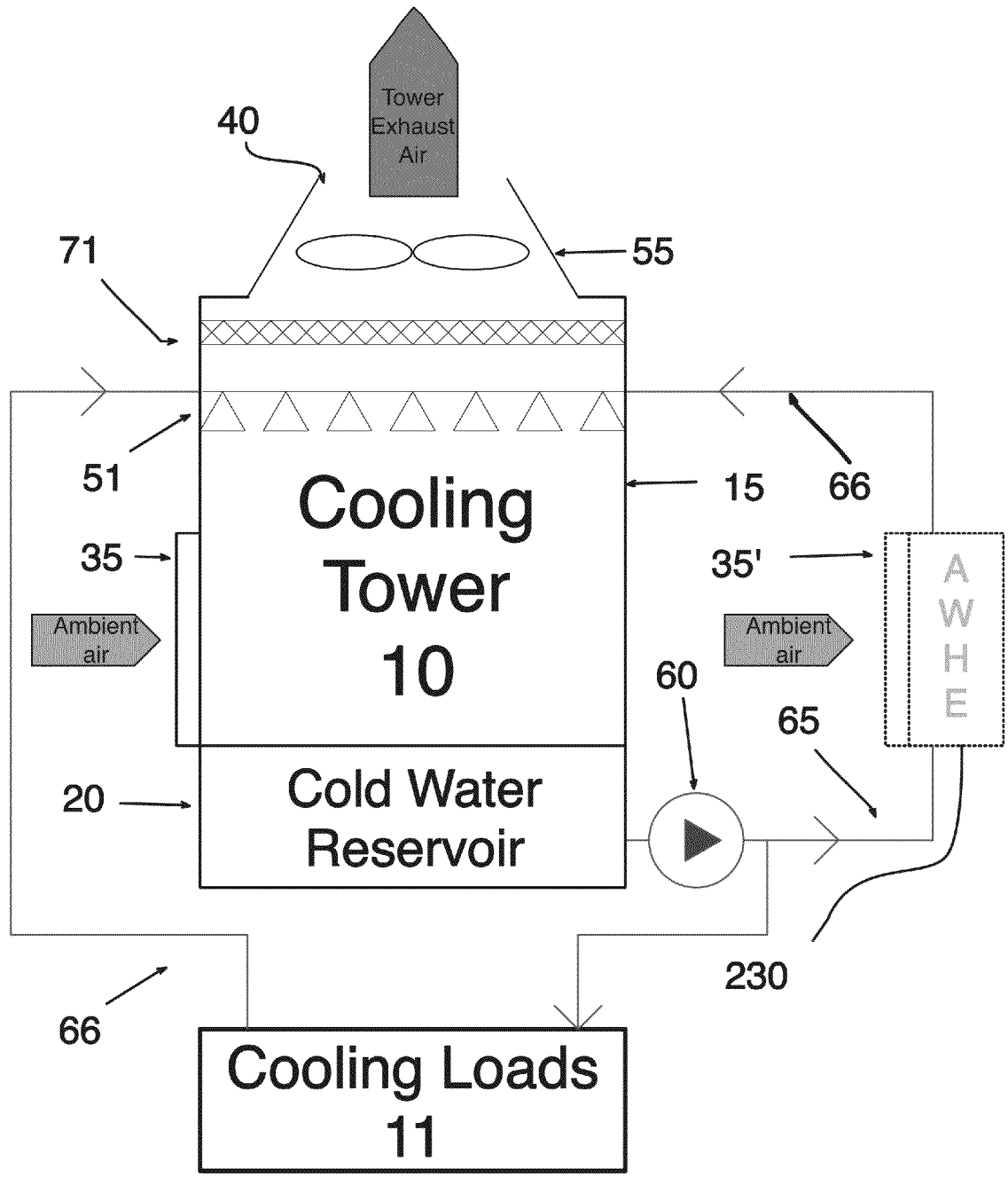
FIG. 1 depicts a cooling tower useful in invention cooling system embodiments.

FIG. 1 shows cooling tower 10, a Type-I cooling tower. Cooling tower 10 comprises tower casing 15, cold-water reservoir 20, air inlet 35, air outlet 40, water distribution system with nozzles 51, fan 55, pump 60, cold water outlet 65, warm water inlet 66, and mist eliminator 71. Fan 55 is not present in some embodiments. Air inlet 35 sits near the bottom of cooling tower 10 in the embodiment depicted by FIG. 1. Other embodiments can be envisioned in which air inlet 35 sits remotely from cooling tower 10, but in those embodiments, ambient air should enter cooling tower 10 below air outlet 40. Cold-water reservoir 20 sits near the bottom of cooling tower 10. But other embodiments exist in which cold-water reservoir 20 sits remotely from cooling tower 10. In those types of embodiments, one of ordinary skill in the art would recognize that additional piping and plumbing would be useful in such embodiments.

In some embodiments, airflow through cooling tower 10 is assisted by fan 55. Fan 55 sits near the uppermost part of cooling tower 10 near air outlet 40. Fan 55 may either be located downstream of mist eliminator 71 or upstream of mist eliminator 71. Alternatively, a fan may mount at the inlet of cooling tower 10, pushing ambient air through cooling tower 10. Of course, a cooling tower could use two or more fans.

In some embodiments, water is distributed by the water distribution system with nozzles 51 over a mass heat transfer media (fill). In these types of embodiments, one of ordinary skill in the art would recognize that mass heat transfer occurs through the interaction between the water and air on the surface of the fill.

As stated previously, FIG. 1 depicts fan 55 on the top of cooling tower 10. Mist eliminator 71 sits near the top of cooling tower 10 in the embodiment depicted in FIG. 1, as will be the case in most embodiments that employ a counter flow design. Some embodiments may use a cross flow cooling tower design, which would lead to a different arrangement of air inlets, water distribution systems, fans, etc. Water distribution system with nozzles 51 attaches to warm water inlet 66, which connects between cooling load 11 at the warm water outlet of air-to-water heat exchanger 230 and water distribution system with nozzles 51. Pump 60 connects to cold-water reservoir 20 and connects to cooling loads 11 and an external air-to-water heat exchanger, such as air-to-water heat exchanger 230, through cold water outlet 65. Cold water outlet 65 also connects to the cold water inlet of air-to-water heat exchanger 230.

Invention cooling systems use a variety of cooling towers in addition to cooling tower 10.

Figure 2:
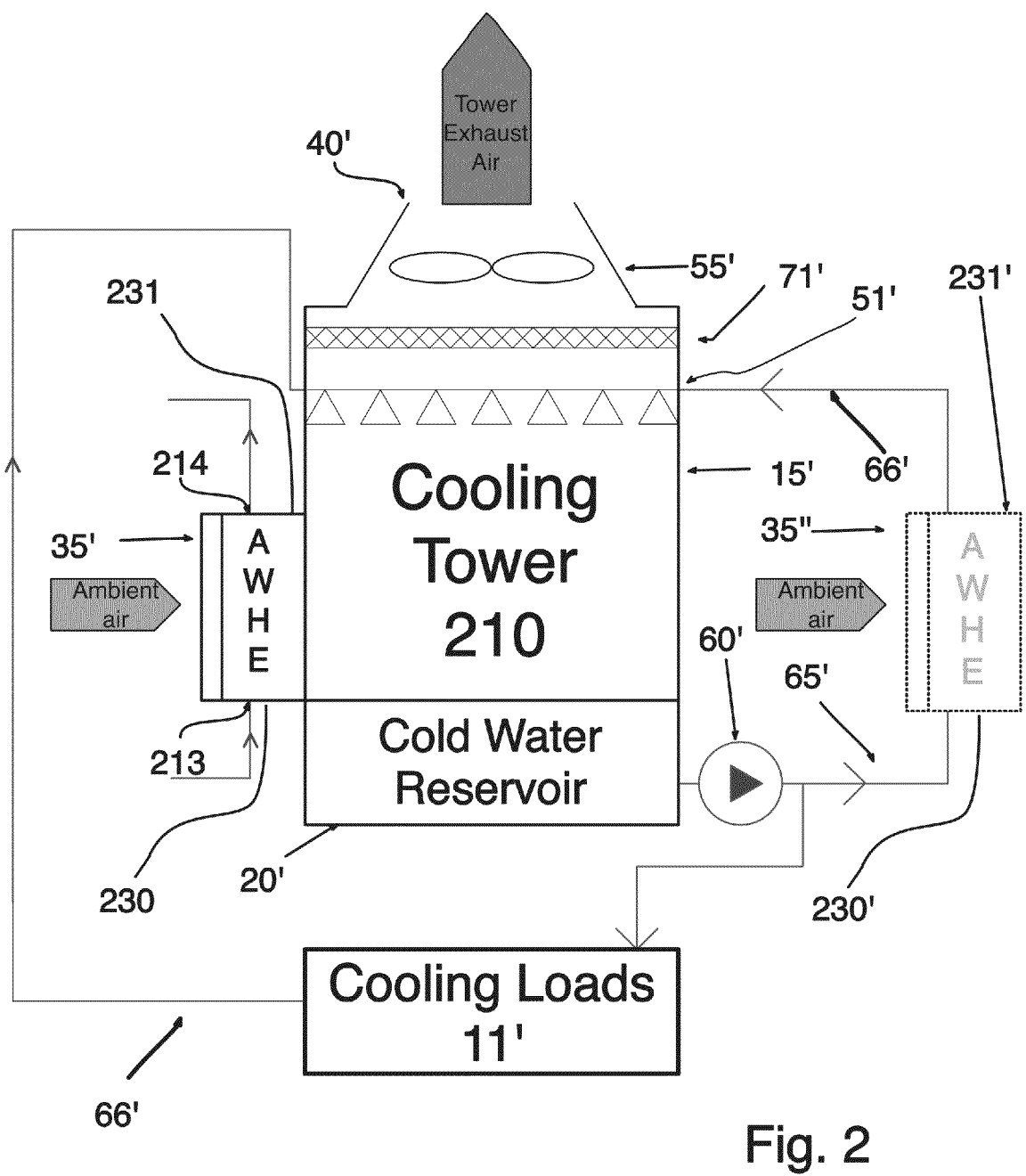
FIG. 2 depicts another useful cooling tower further comprising an air-to-water heat exchanger or an air pre-cooling heat exchanger.

FIG. 2 shows another type of cooling tower used in invention cooling systems—cooling tower 210, a Type-II cooling tower. Cooling tower 210 comprises tower casing 15', cold-water reservoir 20', air inlet 35', air outlet 40', water distribution system with nozzles 51', fan 55', pump 60', cold water outlet 65', warm water inlet 66', mist eliminator 71', and air-to-water heat exchanger 230.

Air-to-water heat exchanger 230 comprises a housing 231, heat exchanger cold water inlet 213, and heat exchanger warm water outlet 214. In some embodiments, heat exchanger cold water inlet 213 connects to cold water outlet 65 and heat exchanger warm water outlet 214 connects to warm water inlet 66 of a Type-I cooling tower. In other embodiments, heat exchanger cold water inlet 213 connects to cold water outlet 65' and heat exchanger warm water outlet 214 connects to warm water inlet 66' of a Type-II cooling tower.

Air inlet 35' sits near the bottom of cooling tower 210, in the embodiment depicted by FIG. 2. Other embodiments exist in which air inlet 35' sits remotely from cooling tower 210 as long as ambient air enters cooling tower 210 below air outlet 40'. Air-to-water heat exchanger 230 sits between air inlet 35' and cooling tower 210. Cold-water reservoir 20' sits near the bottom of cooling tower 210. But other embodiments exist in which cold-water reservoir 20' sits remotely from cooling tower 210. In those types of embodiments, one of ordinary skill in the art would recognize that additional piping and plumbing would be useful.

In some embodiments, fan 55' assists air in flowing through cooling tower 210. Fan 55' sits on the top of cooling tower 210 near air outlet 40'. Fan 55' may sit either downstream of mist eliminator 71' or upstream of mist eliminator 71'. Alternatively, a fan mounts at the inlet of cooling tower 210, designed to push ambient air through cooling tower 210. Of course, this cooling tower may use two or more fans.

In some embodiments, water is distributed by the water distribution system with nozzles 51 over a mass heat transfer media (fill). In these types of embodiments, one of ordinary skill in the art would recognize the mass heat transfer interaction between the water and air on the surface of the fill.

Pump 60' is in fluid communication with cold-water reservoir 20' and in fluid communication with water distribution system with nozzles 51', which is located near the uppermost part of cooling tower 210. In some embodiments, "fluid communication" encompasses a cold water outlet 65' connected to pump 60'. Cold water outlet 65' connects through an external device, comprising a pipe, heat exchanger, or other external device (such as cooling load 11'), to warm water inlet 66'. In these or other embodiments, pump 60' connects to cold-water reservoir 20' and connects to cooling loads 11' and an external air-to-water heat exchanger, such as air-to-water heat exchanger 230', through cold water outlet 65'. Warm water inlet 66' connects to water distribution system with nozzles 51'. In some embodiments, cold water outlet 65' connects to an external device such as an air-to-water heat exchanger mounted upon another or an adjacent cooling tower or a cooling tower of another cooling stage, and then continues on to water distribution system with nozzles 51' through warm water inlet 66'.

In some embodiments, pump 60' services water distribution system with nozzles 51'. In these or other embodiments, pump 60' or another pump pumps cold water from cold-water reservoir 20' to the cold water inlet on an air-to-water heat exchanger mounted on another cooling tower and another pump pumps water to water system with nozzles 51'.

Figure 3:
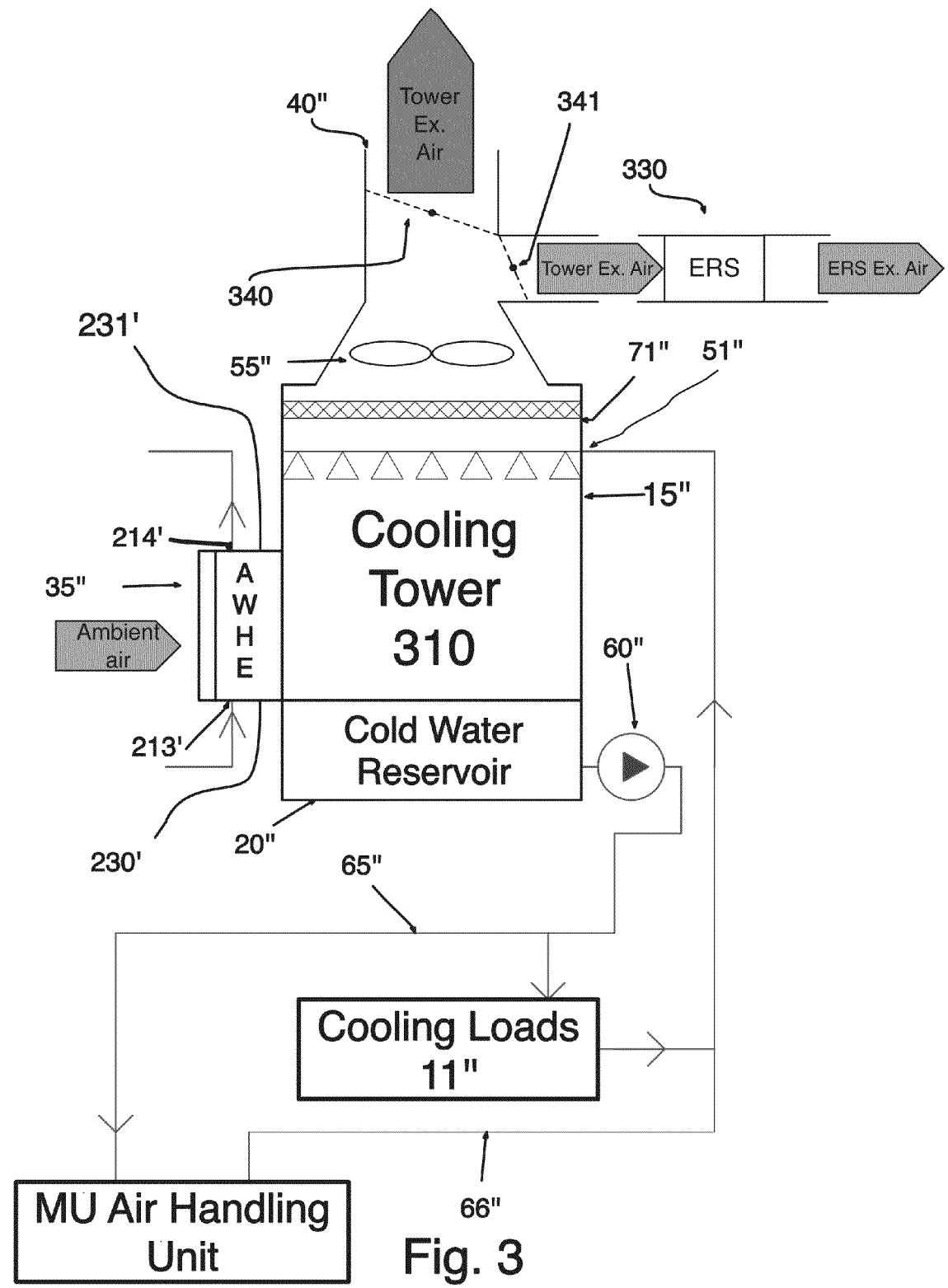
FIG. 3 depicts another useful cooling tower further comprising an energy recovery system.

FIG. 3 shows another type of cooling tower for use in invention cooling systems—Cooling tower 310, a Type-III cooling tower. Cooling tower 310 comprises tower casing 15", cold-water reservoir 20", air inlet 35", air outlet 40", water distribution system with nozzles 51", fan 55", pump 60", pipe 65", mist eliminator 71", air-to-water heat exchanger 230', and energy recovery system 330.

Air-to-water heat exchanger 230' comprises a housing 231', heat exchanger cold water inlet 213', and heat exchanger warm water outlet 214'.

Air inlet 35" sits near the bottom of cooling tower 310 in the embodiment depicted by FIG. 3. Other embodiments exist in which air inlet 35" sits remotely from cooling tower 310 as long as ambient air enters cooling tower 310 below air outlet 40". Air-to-water heat exchanger 230' sits between air inlet 35" and cooling tower 310. Cold-water reservoir 20" sits near the bottom of cooling tower 310. But other embodiments exist in which cold-water reservoir 20" sits remotely from cooling tower 310. In those types of embodiments, one of ordinary skill in the art would recognize that additional piping and plumbing would be useful in such embodiments. As in cooling tower 210, various embodiments exist in which cold-water reservoir 20 and cold-water reservoir 20' are located remotely from cooling tower 10 and cooling tower 210, respectively.

In some embodiments, fan 55" assists air in flowing through cooling tower 310. Fan 55" sits on the top of cooling tower 310 near air outlet 40". Fan 55" may sit downstream of mist eliminator 71' or upstream of mist eliminator 71". Alternatively, a fan mounts at the inlet of cooling tower 310, designed to push ambient air through cooling tower 310. Of course, a cooling tower may use two or more fans.

In some embodiments, water is distributed by the water distribution system with nozzles 51" over a mass heat transfer media (fill). In these types of embodiments, one of ordinary skill in the art would recognize that the mass heat transfer interaction between the water and air on the surface of the fill.

Pump 60" is in fluid communication with cold-water reservoir 20" and in fluid communication with water distribution system with nozzles 51" located near the uppermost part of cooling tower 310. In some embodiments, fluid communication encompasses a pipe 65", connected between pump 60" and water distribution system with nozzles 51".

In some embodiments, pump 60" services water distribution system with nozzles 51". In these or other embodiments, pump 60" or another pump pumps cold water from cold-water reservoir 20" to a cooling load (such as cooling loads 11" or a makeup air handling unit 715). Invention embodiments may cool any suitable cooling load (cooling loads 11"). Suitable cooling loads can be virtually any cooling load and include the following cool loads: environmental cooling (HVAC), building comfort cooling, process cooling, individual server enclosure/rack cooling, or any electronics enclosure generating a heat load. In some embodiments, the cooling load is a make up air handling unit (MU Air Handling Unit or MUAHU). In some embodiments, any cooling load that can be cooled with one or more cooling coils is suitable for this invention.

Figure 8:
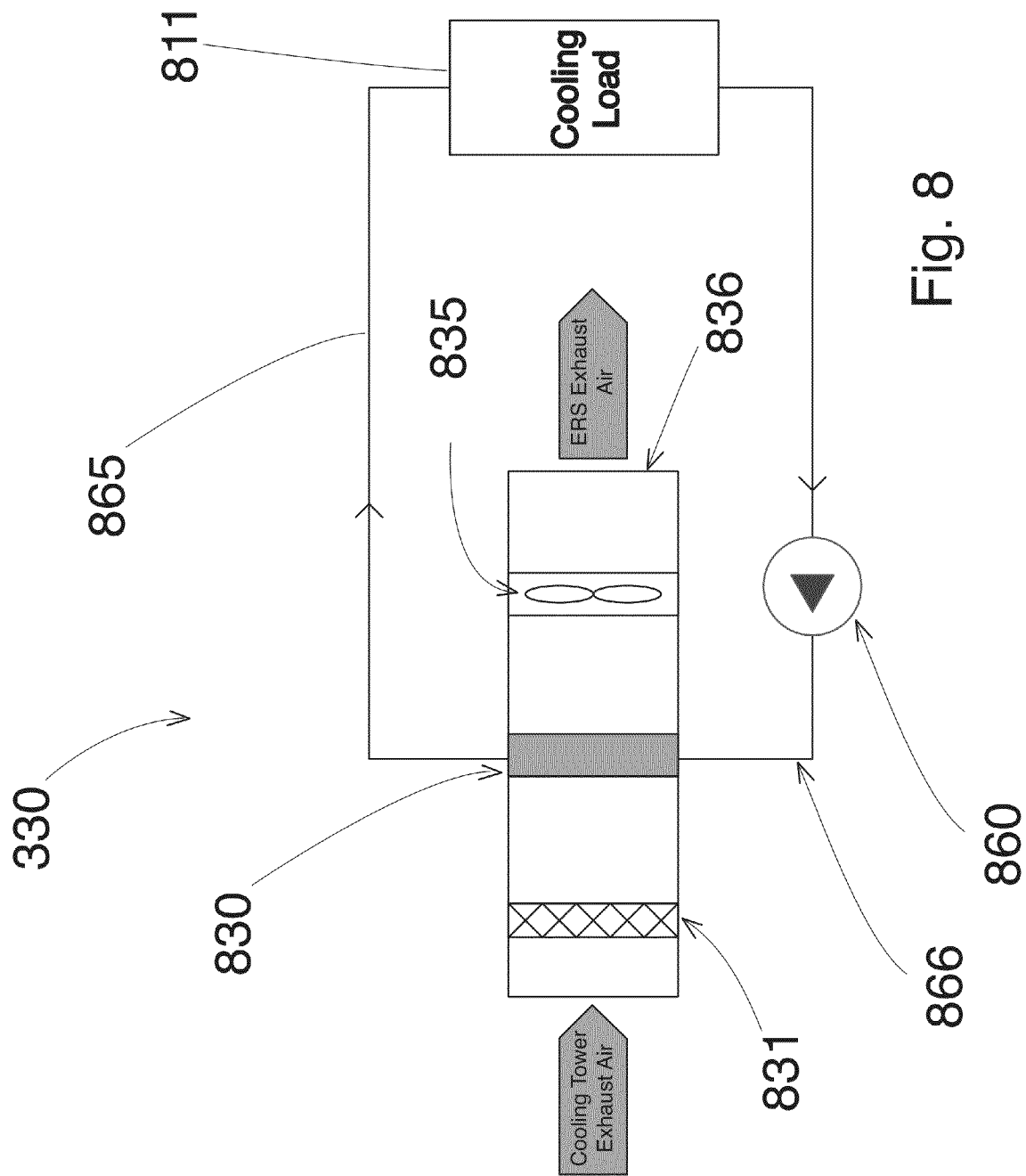
FIG. 8 depicts an energy recovery system, such as seen in FIG. 3.

In some embodiments, such as the embodiment depicted in FIG. 8, energy recovery systems, such as energy recovery systems (ERS) 330 comprise a water circulation system comprising a pump 860 and an air-to-water heat exchanger 830. A particulate filter 831 sits upstream of air-to-water heat exchanger 830, between an associated cooling tower and air-to-water heat exchanger 830. After air-to-water heat exchanger 830 comes fan 835 and finally exhaust air outlet 836 to atmospheric air. ERS 330 connects to any suitable cooling load 811 through a closed-loop water circulation system. The water circulation system comprises air-to-water heat exchanger 830, warm water inlet pipe 866, pump 860, cooling load 811, and cold water outlet pipe 865. Beginning with air-to-water heat exchanger 830, cold water outlet pipe 865 connects to the output of air-to-water heat exchanger 830 and connects to the cold water inlet of cooling load 811. The warm water outlet of cooling load 811 connects to pump 860. Pump 860 connects to warm water inlet pipe 866, which in turn connects to the warm water inlet of air-to-water heat exchanger 830. ERS 330 recovers "coolness" from the cool air exhaust stream of an associated cooling tower. Since this is a closed loop fluid circulating system, the water can be any suitable heat transfer fluid including a water and glycol mixture.

In some embodiments, energy recovery system 330 operates in conjunction with dampers 340, 341 in an associated cooling tower. Damper 340 sits in the air outlet pathway and damper 341 sits in the ERS air pathway. Both are disposed to allow the air flow to be adjusted from 100% through air outlet 40" and 0% through ERS 330, 0% air outlet 40" to 100% through ERS 330, or any combination of air flows. Any of the cooling tower examples described in this document may additionally comprise an energy recovery system located at the air outlet of the cooling tower.

In any of the cooling tower types, one or more pumps may be variable speed pumps or fixed speed pumps. In any of the cooling tower types, one or more fans may be fixed speed fans or variable speed fans.

In addition to the components discussed above, the cooling towers comprise monitoring and command-and-control hardware and optionally software, to monitor and control the operation of the cooling towers. Various types of monitoring and command-and-control hardware and software are familiar to those of ordinary skill in the art. For instance, variable speed fans have command-and-control hardware and software that operate to vary the speed of fans to control airflow through the cooling towers. Variable speed pumps have command-and-control hardware and software to control the flow rate of cold water from cold-water reservoir through the various other components of the cooling tower and to cooling loads. Control over such components is based on the cooling needs of the cooling load, outside temperatures, etc. Control is exercised in some embodiments to only run necessary fans, pumps, etc. to meet the necessary cooling load without wasting energy. One category of energy that is saved because of the intervening command and control systems, is energy normally wasted by operating fans, pumps, etc. faster or at a higher capacity than necessary to satisfy the cooling load demands on the cooling system. In some embodiments, components of the MECS are operated by a dedicated control system communicating with a building energy management system. The control software of the control system optimizes the operation of the cooling system components to meet variable or constant conditioned space cooling loads, process cooling loads, or other cooling loads at the absolute lowest or minimum amount of energy consumption.

Figure 4:
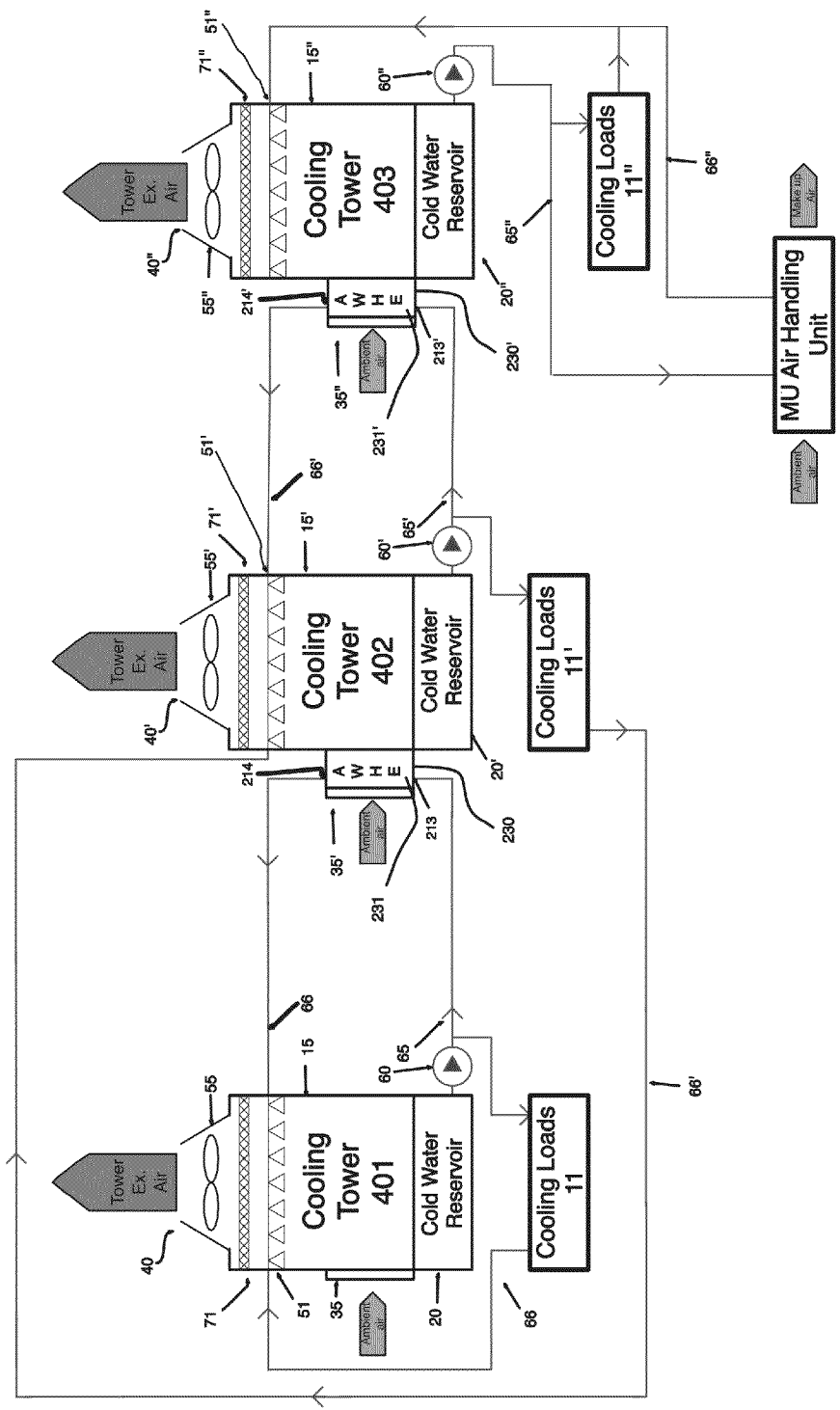
FIG. 4 depicts a cooling system embodiment of the invention.

FIG. 4 depicts an embodiment of an invention cooling system. Cooling system 400 comprises three cooling towers: a Type-I cooling tower, cooling tower 401; a Type-II cooling tower, cooling tower 402; and a Type-III cooling tower, cooling tower 403. Cold-water reservoir 20 of cooling tower 401 connects through cold water outlet 65 to heat exchanger cold water inlet 213, which connects to air-to-water heat exchanger 230 of cooling tower 402. Air-to-water heat exchanger 230 of cooling tower 402 connects through heat exchanger warm water outlet 214 to warm water inlet 66, which returns warm water to cooling tower 401, as shown in the figure. In some embodiments, warm water returns to the water distribution system with nozzles 51 of cooling tower 401.

Cold-water reservoir 20' of cooling tower 402 connects through cold water outlet 65' to heat exchanger cold water inlet 213' of air-to-water heat exchanger 230' of cooling tower 403. Air-to-water heat exchanger 230' connects through heat exchanger warm water outlet 214', to warm water inlet 66', which returns warm water to cooling tower 402, as shown in FIG. 4. In some embodiments, warm water returns to the water distribution system with nozzles 51' of cooling tower 402.

Cold-water reservoir 20" of cooling tower 403 has cold water outlet 65" that connects to the cold water inlet of any suitable cooling load 11". Likewise, warm-water returns through warm water inlet 66" connecting the warm water outlet of cooling load 11" to the water distribution system with nozzles 51" of cooling tower 403.

Cold-water reservoir 20 of cooling tower 401 and cold-water reservoir 20' of cooling tower 402 may connect to optional cold-water supply and warm-water return lines connecting to various different cooling loads 11, 11'. One of ordinary skill in the art would choose which cold-water reservoir (which cooling stage) to use based on the nature of the cooling load. In some embodiments, the cooling system comprises four or more cooling towers.

Figure 5:
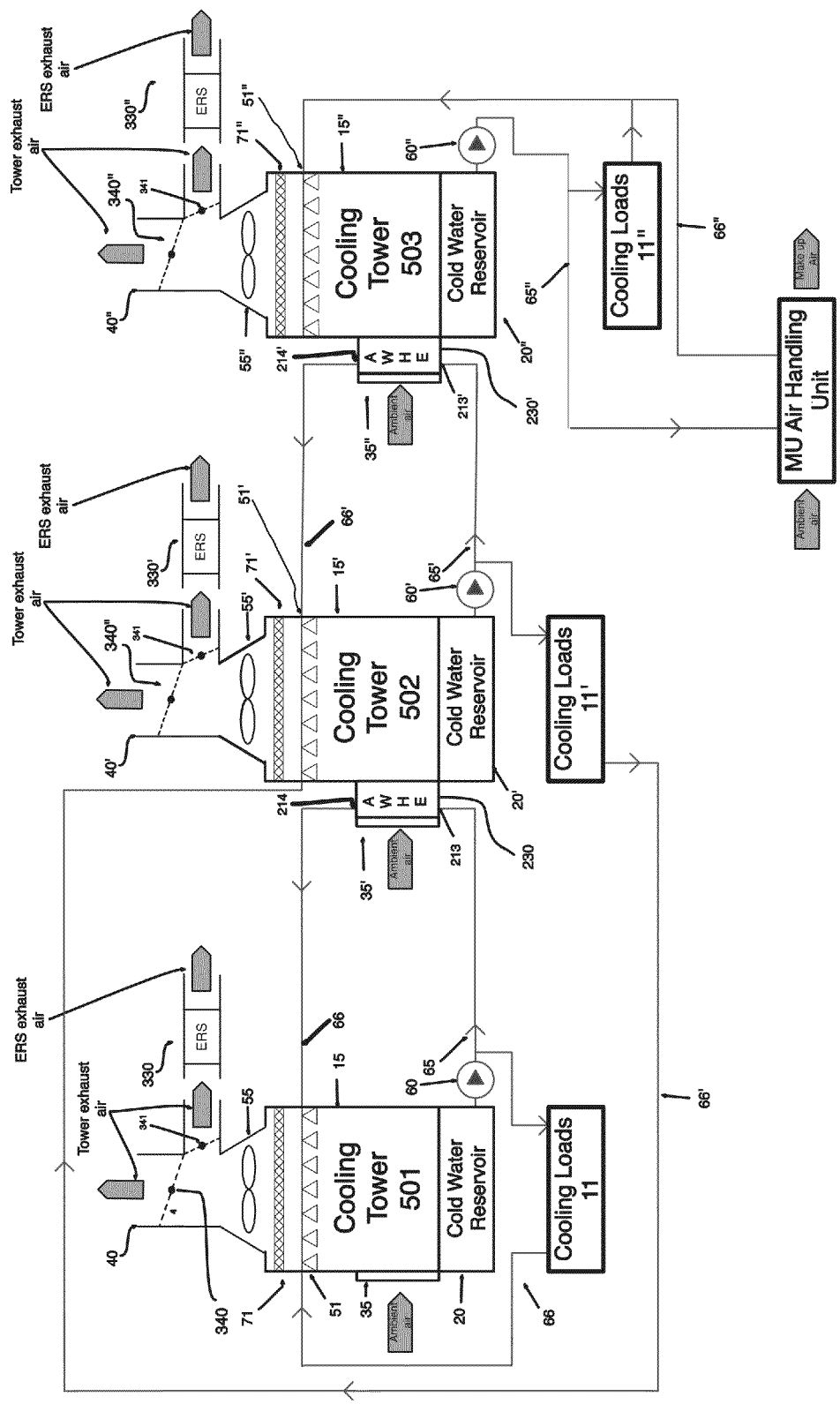
FIG. 5 depicts another cooling system embodiment of the invention.

FIG. 5 depicts cooling system 500, which is similar to cooling system 400 of FIG. 4, discussed above. In addition to the components and connectivity discussed for the cooling system above, this cooling system contains at least one energy recovery system 330 wherein the energy recovery system 330 attaches to one or more cooling towers such as cooling towers 501, 502, 503 to recapture the "coolness" of cold air exiting from the cooling tower. In some embodiments, cooling system 500 comprises a second or third energy recovery system 330, 330' on the second or third cooling towers, such as cooling tower 502 or cooling tower 503. And in some embodiments, the cooling system comprises four or more cooling stages with an energy recovery system on one or more cooling towers.

One typical, suitable cooling load for a cooling system such as cooling system 400 or 500 is a Make Up Air Handling Unit (MUAHU).

Makeup Air Handling Unit 715 comprises one or more air particulate filters 750 at or near air inlet 720 of MUAHU 715. Following the air path through MUAHU 715, air-to-air heat exchanger 745 is downstream of air inlet 720 and air particulate filters 750. Air-to-air heat exchanger 745 comprises two air paths that do not mix with each other. One of those air paths relates to the make up air and the other relates to the building exhaust air. Fan 755 pulls building exhaust air through air-to-air heat exchanger 745, and fan 735 pulls make up air through air-to-air heat exchanger 745. An air-to-water heat exchanger 740 comes after air-to-air heat exchanger 745 in MUAHU 715. A variable or fixed speed supply fan 735 is disposed in MUAHU 715 downstream of air-to-water heat exchanger 740. In some embodiments, a high pressure water fog humidifier 732 (or other types of direct adiabatic humidifiers) is disposed in MUAHU 715 downstream of variable or fixed speed supply fan 735. In some embodiments, a mist eliminator 730 sits near air outlet 731 of MUAHU 715 downstream of the humidifier 732. Cold water outlet 65" transports cold water from a cooling system to the cold water inlet of air-to-water heat exchanger 740. Warm water inlet 66" transports warm water from the warm water outlet of air-to-water heat exchanger 740 back to the cooling system.

In some embodiments, components of the MECS are operated by a dedicated control system communicating with a building energy management system. The control software of the control system optimizes the operation of the cooling system components to meet variable or constant conditioned space cooling loads, process cooling loads, or other cooling loads at the absolute lowest or minimum amount of energy consumption. Executing this software, the control system, depending on the conditioned space load, the process cooling load, or some other cooling load and indoor and outdoor air dry bulb and wet bulb temperatures, automatically provides the necessary speed control over cooling towers fans, supply air fans of makeup air-handling units, return and supply air fans, return and supply air humidifiers, etc., and the necessary flow control over the cooling fluids by controlling pumps, which are typical components of commercial, industrial, or other cooling systems. The control system also automatically adjusts all operational components of the MECS to achieve the amount of cooling needed for the load in real time to maximum cooling efficiency.

In some embodiments, determined by the cooling application and the environmental conditions of the specific geographical area, components of the MECS are rearranged in an order and sequence and properly sized to maximize the generation of cold water for given environments. These cooling applications or any kind of cooling application in commercial real estate buildings, industrial real estate buildings, and government real estate buildings; manufacturing plants; industrial processing plants; food/beverage processing plants and agricultural buildings.

In some embodiments, an individual electronics enclosure cooling system uses cold water generated by the different stages of the MECS to apply process cooling method to each cooling load in each individual electronics enclosure. In some embodiments, invention cooling systems are optimized for providing cold water to individual electronic enclosures or racks, such as server racks to cool the loads. The electronics enclosure is designed to allow space air to be drawn in to cool the electronics equipment inside the enclosure through an air inlet and further pulled through the enclosure to an air outlet exit point. The warm air, which was heated by the electronics within the enclosure, exits the air outlet of the enclosure and enters into an air inlet of one or more fan coils units. There the warm air is cooled by circulating cooling water such as from an invention cooling system, i.e. cold water from different stages of the MECS, before the cooled air is returned to the space from the air outlet of the fan coil unit.

Cooling system embodiments exist comprising 2-10, 2-5, 5, 4, 3, or 2 types of cooling towers or cooling tower cells. Each of these embodiments comprises 0, 1, or 2 energy recovery system per cooling tower.

Operation of MECS System

Operationally, any cooling tower suitable for use with the cooling systems of the current invention operates as described below. A cooling tower cools incoming ambient air and water from the cold-water reservoir 20. Fan 55 assists in moving air through the cooling tower. Ambient air enters the cooling tower through air inlet 35 and exits the cooling tower at the top through air outlet 40. As the fan pulls air into the cooling tower, water distribution system with nozzles 51 introduces water on top of the fill through water distribution system nozzles 51 causing or allowing contact between the moving ambient air and the falling liquid water within the till. The cooled falling liquid water is collected in the cold-water reservoir 20 and the saturated cold air exits the cooling tower through air outlet 40.

Pump 60 pumps water from cold-water reservoir 20 through cold water outlet 65 to a cooling load, such as air-to-water heat exchanger 230. After moving through the cooling load, the now warmer, cold water travels through warm water inlet 66 into water distribution system with nozzles 51 located above the fill of cooling tower 10. Water falling from the top of cooling tower 10 passes by ambient air moving from air inlet 35 at the bottom of cooling tower 10 to air outlet 40 at the top of cooling tower 10. Fan 55 moves air through cooling tower 10.

This air-water interaction causes some water to evaporate. Water evaporation requires energy, in this case, the energy is extracted from the water flowing through the fill, leaving the water at a lower temperature and the air exiting air outlet 40 at DB temperature lower than ambient air temperature. That is, the air-water interaction lowers the temperature of the air as the air passes through the cooling tower. Cold water falls to the bottom of cooling tower 10 and collects in cold-water reservoir 20.

All psychometric parameters of the given air have direct correlation with each other in any kind of cooling apparatus. Knowing the dry bulb temperature, the wet bulb temperature, and the barometric pressure of the air allows the determination of all other parameters of the air such as enthalpy, relative humidity, dew point temperature, absolute moisture content, specific volume, etc. For a particular sample of air, the maximum wet bulb temperature is equal to the dry bulb temperature. Larger differences between the dry bulb temperature and the wet bulb temperature indicate drier air.

One of ordinary skill in the art knows that adiabatic cooling of a particular sample of ambient air equal to or below its wet bulb temperature is not possible. During the adiabatic air cooling process, the air's dry bulb temperature is lowered and its moisture content is increased, however, its wet bulb temperature and enthalpy do not change. This has ramifications in using evaporative cooling towers.

Cold-water reservoir 20 located near the bottom of cooling tower 401 feeds cooling loads 11. The warm water from cooling load 11 connects to warm water inlet 66, and to water distribution system with nozzles 51 of cooling tower 401 completing the cycle. Gravity causes the water to fall through the cooling tower fill back into the cold-water reservoir. During this trip, the water again interacts with the air flowing up through the cooling tower and is in direct contact with the air flowing through the cooling tower. The main result from this air-water contact is that, as before, some amount of the water evaporates in the air flowing up through the cooling tower. And the cycle continues.

The difference between the dry bulb temperature and the wet bulb temperature is smaller after passing through the cooling tower. Therefore, one of ordinary skill in the art recognizes that the trip through the cooling tower lowers the temperature of the water.

Each of the multiplicity of invention cooling towers operates in this manner. The temperature of the cold water generated by any cooling tower is dependent on the wet bulb temperature of the air entering the cooling tower. The cooling towers use ambient air during operation. Therefore, the only way of attaining cold water temperatures lower than the wet bulb temperature of the ambient air, is to lower the wet bulb and dry bulb temperatures of the ambient air entering the cooling tower. In other words, sensible pre-cooling of the ambient air entering the cooling tower reduces its wet bulb and dry bulb temperature thereby allowing colder water temperatures to be achieved at each cooling stage.

The Type-II cooling towers and Type-III cooling towers add sensible pre-cooling of the ambient air entering the cooling towers through an air-to-water heat exchanger at their air inlets. These air-to-water heat exchangers, also called pre-cooling heat exchangers sit between their respective air inlet and respective cooling tower. A cold-water reservoir of another stage of the cooling system or of a previous stage of the cooling system provides cold water for the air-to-water heat exchanger. As ambient air passes through the heat exchanger, it cools and water from the cold-water reservoir warms. The water returns to the source cooling tower water distribution system with nozzles 51 continuing the cycle. The source cooling tower ultimately removes the heat gained by the cold water as it passed through the air-to-water heat exchanger.

The ambient air passes through the air-to-water heat exchangers which lowers the wet bulb and dry bulb temperatures of the air entering the Type-II or Type-III cooling towers. Since the wet bulb temperature serves as the lower limit for the temperature of the cold-water in this cooling towers and since the wet bulb temperature of the pre-cooled air is lower than that of the incoming ambient air in a previous cooling stage, the Type-II or Type-III cooling tower produces cold water with a temperature lower than cold water produced by an earlier cooling stage. This ability of a later cooling stage to produce colder water than an earlier cooling stage stems directly from the fact that the sensible pre-cooling of ambient air without exposing it to added moisture simultaneously drops the air's dry bulb and wet bulb temperatures. Dropping the wet bulb temperature of each stage's air entering the cooling towers lowers the temperature of the cold water produced by these stages. Thus, cascading cooling towers allows the cooling system to produce lower temperature cold water in each of the successive stages.

Returning to FIG. 4, the cooling system functions to produce cold water to service cooling loads 11, 11', 11", and the cooling load resulting from MU Air Handling Unit 715. In cooling tower 401, fan 55 operates to pull air ambient air through air inlet 35, through air-to-water heat exchanger 230, through the wet fill, past the water distribution system with nozzles 51, through the mist eliminator 71, up through the fan 55, and finally out air outlet 40. Simultaneously with air moving up through the cooling tower 401, pump 60 pumps cold water from cold-water reservoir 20, through cold water Outlet 65, connected to heat exchanger cold water inlet water pipe 213, through air-to-water heat exchanger 230 on cooling tower 402, out air-to-water heat exchanger 230, through heat exchanger warm water outlet water pipe 214 connected to warm water inlet 66, and, completing the cycle, to water distribution system with nozzles 51 of cooling tower 401. Water distribution system with nozzles 51 distributes water evenly across the top of the fill of cooling tower 401. The water falls by gravity through the fill of cooling tower 401 to cold-water reservoir 20. As cold water from cold-water reservoir 20 moves through the system, it provides a source of indirect sensible pre-cooling for air entering cooling tower 402 through air-to-water heat exchanger 230. The warmed water is returned to cooling tower 401 via the water distribution system with nozzles 51.

Fan 55' of cooling tower 402 operates to pull ambient air into cooling tower 402 through air inlet 35', through air-to-water heat exchanger 230, through the wet fill, past the water distribution system with nozzles 51, through the mist eliminator 71, up through fan 55', and finally out air outlet 40' of cooling tower 402. Water from water distribution system with nozzles 51' distributes water evenly across the top of the fill of cooling tower 402. As the water falls by gravity through the fill of cooling tower 402, it interacts with the moving pre-cooled air stream that has been pre-cooled by air-to-water heat exchanger 230. The air-water interaction within cooling tower 402 causes some water to evaporate. This evaporation extracts (heat) energy out of the circulating water stream and transfers this energy to the interacting air stream of cooling tower 402. The cold water obtained by the result of the above air-water interaction is collected in cold-water reservoir 20'. The journey of the cold water begins again as pump 60' pumps water from cold-water reservoir 20' through cold water outlet 65', to cold water inlet pipe 213' into air-to-water heat exchanger 230', out warm water outlet pipe 214', through warm water inlet 66', into water distribution system with nozzles 51'. Since cooling tower 402 operates with an air stream comprising air with a lower wet bulb temperature and dry bulb temperature (because of the air's trip through air-to-water heat exchanger 230), the achievable temperature of the cold water in cold water reservoir 20' is substantially lower than the temperature that the cold water of cold water reservoir 20 can achieve.

As described above for tower 402, fan 55" of cooling tower 403 operates to pull ambient air into air inlet 35", through air-to-water heat exchanger 230', through the wet fill, past the water distribution system with nozzles 51", through the mist eliminator 71", up through fan 55" and finally out air outlet 40" of cooling tower 403. Pump 60" pumps water from cold-water reservoir 20", through pipe 65", to cooling loads 11" and MU Air Handling Unit 715. The warm water from the above loads is returned back to cooling tower 403 through pipe 66". Pipe 66" connects to the water distribution system with nozzles 51" of cooling tower 403 which evenly distributes water across the top of the fill. As the water falls by gravity through the fill of cooling tower 403, it interacts with the moving pre-cooled air stream that has been pre-cooled by air-to-water heat exchanger 230. The air-water interaction within cooling tower 403 causes some water to evaporate. This evaporation extracts (heat) energy out of the circulating water stream and transfers this energy to the interacting air stream of cooling tower 403. The cold water obtained by the result of the above air-water interaction is collected in cold-water reservoir 20". The journey of the cold water begins again as pump 60" pumps water from cold-water reservoir 20" to cooling loads 11" and MU Air Handling Unit.

The first cooling state, comprising cooling tower 401, produces cold water that approaches the wet bulb temperature of the ambient air. This cold water services air-to-water heat exchanger 230, a pre-cooling heat exchanger, located at air inlet 35' of cooling tower 402. Cooling tower 402 composes part of cooling stage 2. Since the cooling system operates to ultimately provide pre-cooled air to cooling tower 402, when cooling stage 2 comprising cooling tower 402 operates, it produces water that is colder than the cold water produced by cooling stage 1. This colder water ultimately provides cooling tower 403 with air that has an even lower wet bulb and dry bulb temperature than previous stages allowing cooling tower 403 to produce cold water that is even colder than the cold water produced in the second cooling stage.

Each of cooling towers 402 and 403 uses pre-cooled air that has a lower wet bulb temperature than ambient air. Using the pre-cooled air allows these cooling towers to reach significantly lower cold water temperatures and exhaust air temperatures than cooling towers without air pre-cooling. In some embodiments, the cold exhaust air exiting the cooling towers is utilized as a source of energy by the Energy Recovery Systems to further produce useable cold water or cold air and to produce additional energy savings as compared to traditional cooling methods. Such an embodiment is depicted in FIG. 5.

The cooling system depicted in FIG. 5 functions substantially similarly to that of the cooling system of FIG. 4.

In addition to the cold water generated by the cooling towers, such as cooling towers 501, 502, 503, the cooling towers generate exhaust air that is colder than ambient air and can be utilized as a significant energy source for additional cooling loads. The exhaust air exits the cooling towers through air outlets 40, 40', 40". In some embodiments, dampers 340, 340', 340" control exhaust air flow out of the respective cooling towers. These dampers divert the exhaust air flow from cooling tower air outlets 40, 40', 40". Dampers 340, 340', 340" can direct exhaust air streams in the following optional ways. Option A—the dampers direct 100% of the exhaust air through energy recovery systems 330, 330', and 330". Option B—the dampers direct 100% of the exhaust air through air outlet 40, 40', 40" to the outside atmosphere bypassing the energy recovery systems. Option C—based on cooling load demands, the dampers split the exhaust air stream in any desired ratio between energy recovery systems 330, 330', 330" and exhaust air outlets 40, 40', 40".

As seen in FIG. 8, energy recover system 330 functions to reclaim some of the "coldness" from the cooling tower exhaust air by using internal fan 835 to move cool exhaust air past air-to-water heat exchangers 830 in ERS 330. This cold source can be used to service any appropriate cooling load that one of ordinary skill in the art would consider suitable. Warm water from the cooling load enters air-to-water heat exchanger 830 through warm water inlet pipe 866 and travels through air-to-water heat exchangers 830 where the water gives off heat to the air stream flowing out of the cooling tower. Next cold water flows from the cold water outlet of air-to-water heat exchangers 830 into cold water outlet pipe 865. Cold water outlet pipe 865 carries the cold water to the cold water inlet of cooling load 811 where the cold water picks up heat from cooling load 811 and flows through the warm water outlet of cooling load 811, through pump 860 into warm water inlet pipe 866 to begin the cycle again. Pump 860 drives the flow through the closed loop system.

To present a better understanding of the design and operational specifics of the MECS, demonstration of its cooling capability and performance, and for eventual comparison with a Conventional Mechanical Refrigeration System, the following design conditions are used to provide a comparable engineering analysis for both systems performing equal tasks:

EXAMPLES

Example 1

Cooling Application a) Cool a conditioned space with the summer design sensible cooling load of approximately 92 tons of equivalent refrigeration.
b) Project Location—Phoenix, Ariz.
c) The ASHRAE specified design ambient air parameters for Phoenix Ariz. for cooling applications are 110.2° F. DB and 70° F. WB.
d) The ASHRAE specified design ambient air parameters for Phoenix Ariz. for evaporation applications for 0.4% are 76.1° F. WB and 96.4° F. MCDB (Mean Coincident dry bulb temperature). (For reference only)
e) The indoor design air temperature is approximately 80° F. DB at a comfortable 40 to 65% relative humidity range.
f) The preliminary estimate of required volume of makeup/supply cooled air into the conditioned space is approximately 35,000 CFM.

These calculations are provided as illustrative example only for the exemplary system described herein. They do not limit the invention in any way and are only provided to guide the user in implementing other equivalent implementations of the invention.

Typical MECS engineering design and component list selected for perform ing the above-mentioned cooling.

The MECS is configured for this particular application, and it consists of the following main components:

Three induced draft counter flow cooling towers or comparable Air Washers; variable speed exhaust air fans; and variable flow circulating water pumps; and.

Pre-cooling coils located at the ambient air inlets of the cooling towers.

The components of makeup air-handling unit 715 sit in the following sequence and following the airflow direction. Powered by a fixed or variable speed supply fan 735, ambient air passes through the air inlet 720 of makeup air-handling unit 715. Then it passes through air particulate filter(s) 750 and air-to-air heater exchanger 745. Air flow through air-to-air heat exchanger 745 is assisted by fan 755. This air flow is building exhaust air, which pre-cools ambient air destined for introduction into the building. Next, it reaches cooling coil 740. Cold water is pumped from a cooling stage of a cooling system, through pipe 65' through the cold water inlet 213 to cooling coil 740 of makeup air-handling unit 715 and then through the cooling coil 740 to the warm water outlet 214 to pipe 66' back to the cooling system. As air passes over cooling coil 740, it gives off heat to the cold water causing the temperature of the air to fall providing sensible cooling.

In applications where the space does not required 100% ambient air but still has the same space cooling load, the air-to-air heat exchanger 745 could be replaced with an air-mixing module (not shown). The air-mixing module mixes large volumes of lower temperature return air from the conditioned space with the minimal required volume of ambient air (ventilation air). This mixed air application will significantly reduce the total energy consumption of the MECS, (Note: if this air-mixing application is implemented, the need for humidification is greatly reduced or eliminated in most cases.)

Return Air Sub-System (RA Sub-System)—the RA Sub-System contains ductwork, an adiabatic humidification chamber, and return air exhaust fan. The RA Sub-System controls temperature, humidity, and air volume of the return air stream being fed to one side of the air-to-air heat exchanger 745 or to the air-mixing module.

The integrated MECS contains the following sequential process cooling stages:

Cooling Stage-1 (Water Cooling)

Figure 6:
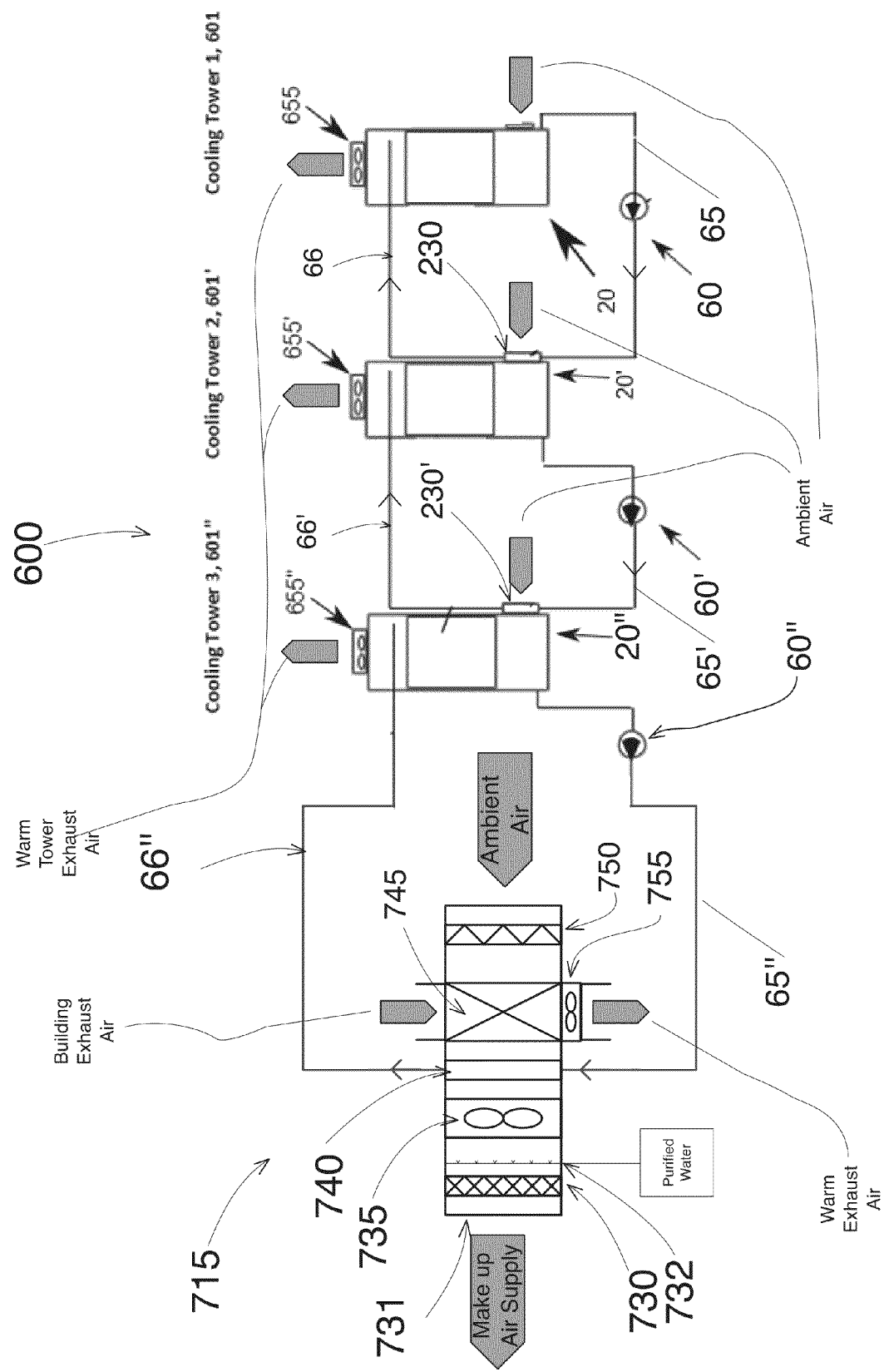
FIG. 6 depicts another cooling system embodiment of the invention.
Figure 7:
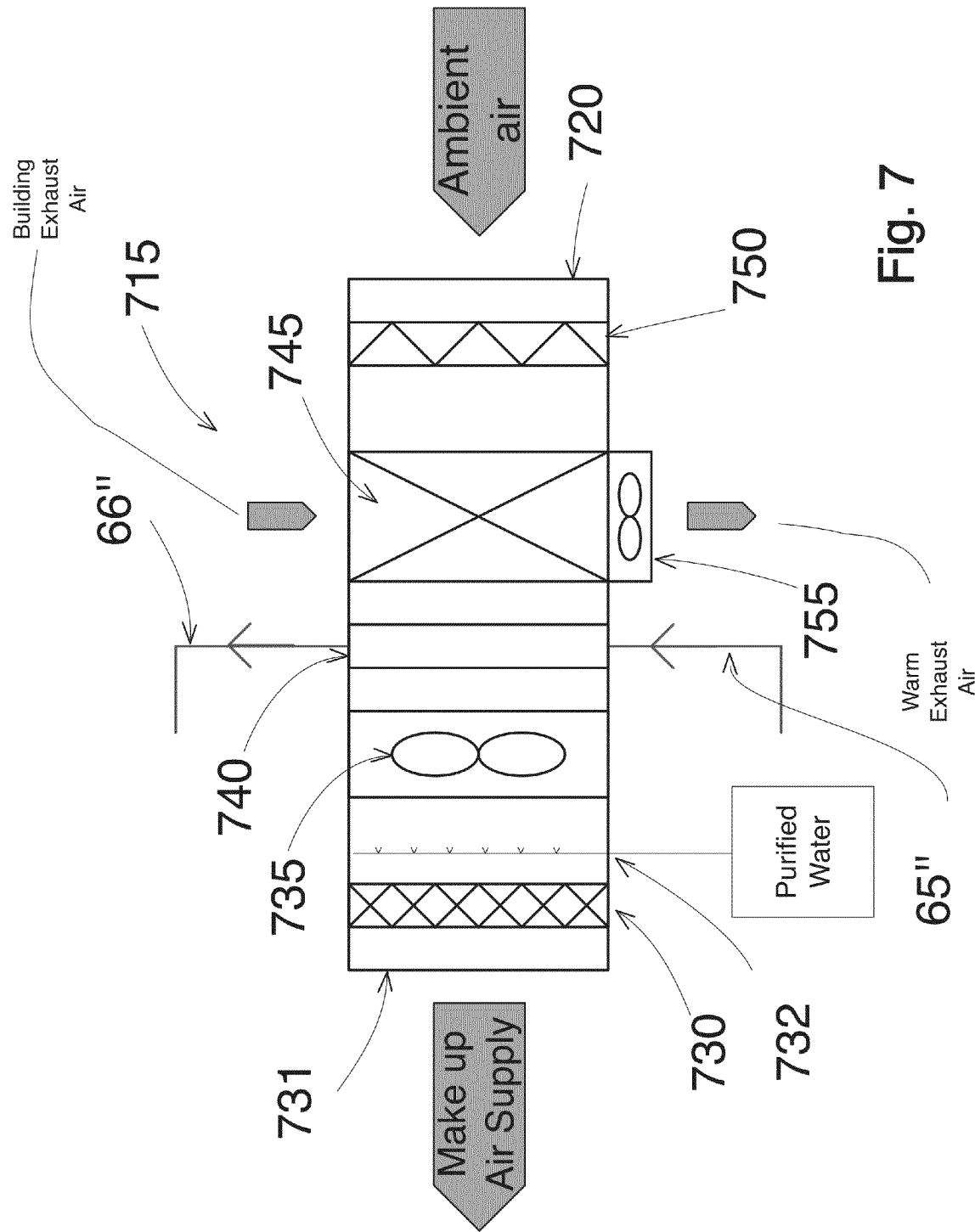
FIG. 7 depicts a makeup air handling unit.

From FIG. 6, this cooling stage comprises cooling tower 601 and a water pump 60. Cooling tower 601 generates cold water that collects in its cold-water reservoir 20. Cooling stage-1 generates cold water for pre-cooling ambient air entering into the next stage cooling towers. The cooling coil (air-to-water heat exchanger 230) pre-cools ambient air entering into the next stage cooling tower 601' using some of the cold water from cooling tower 601.

Cooling Stage-2 (Water Cooling)

This cooling stage comprises a second cooling tower 601', a water pump 60', and a cooling coil (air-to-water heat exchanger 230'). Cooling tower 601' generates cold water that collects in its cold-water reservoir 20' and supplies cold water to the air-to-water heat exchanger 230' of the third cooling tower 601".

Cooling Stage-3 (Water Cooling)

This cooling stage comprises third cooling tower 601", a water pump 60", and a cooling coil (air-to-water heat exchanger 230'). Cooling tower 601" generates cold water that collects in its cold-water reservoir 20", and supplies cold water to a cooling coil (air-to-water heat exchanger 740) installed in the housing of makeup air-handling unit 715 or some other cooling load or process cooling load.

Cooling Stage-4 (Makeup Air Cooling)

This cooling stage comprises a cooling coil (air-to-water heat exchanger 740) installed in the makeup air-handling unit. The cooling coil (air-to-water heat exchanger 740) receives cold water from third cooling tower 601". The cooling coil (air-to-heat exchanger 740) sits in the housing of makeup air-handling unit 715 downstream of an air-to-air heat exchanger 745 and can either cool air leaving the air-to-air heat exchanger 745 or, if the air-to-air heat exchanger is not included, pre-cools warm ambient air as it enters into the makeup air-handling unit 715.

Cooling Stage-5 (Makeup Air Cooling)

This stage is the final cooling stage inside of the makeup air-handling unit 715. It provides adiabatic cooling of the supply air using any suitable direct evaporative cooling system 732, such as using high pressure water fogging nozzles.

Cooling Stage-6 (Return Air Cooling)

This cooling stage is a part of the return air RA Sub-System, combining the return air (RA) ductwork, evaporative air humidification chamber, and the RA exhaust fan. The humidification chamber comprises a humidifier that could be either a high-pressure water dispersion type, or any other evaporative humidifier type appropriate for the application. The purpose of cooling stage-6 is to provide high-efficiency adiabatic cooling of the RA stream before its heat exchange interaction with the warm ambient air stream in the air-to-air heat exchanger 745, or before mixing with ambient air (ventilation air) in the air-mixing module, if the cooling system is configured to use an air-mixing module.

Cooling Stage-7 (Makeup Air Cooling)

This cooling stage is an air-to-air heat exchanger and its function is to pre-cool outside warm air using the lower temperature return air stream from the conditioned space and thereby reduce the MECS total energy use.

Different cooling applications call for varying MECS configurations.

Each MECS is configured to produce the required amount of cooling for a defined application, such as conditioned space or process cooling for industry. Each design factors in the peak cooling demand at summer conditions for the local environment.

The MECS has a dedicated control and monitoring system with appropriate software to provide optimum, moment-to-moment control over operating parameters that yield the required amount of cooling at minimal power consumption based on constantly changing building cooling loads, process cooling loads, and ambient air conditions.

MECS Cooling Stages—Divided into Water and Air Cooling Stages

Described in a different way, in general, all cooling stages of MECS fall into two states: a water-cooling stage and an air-cooling stage.

A. Water Cooling Stages

The three water-cooling stages of the MECS use three cooling towers 601,601',601" with each stage having a cooling tower, a cooling coil (optional in the first cooling tower), and a pump arranged in series to provide a cascade of cooling stages. That is, the cooling tower of a preceding stage generates cold water similarly to prior art cooling towers. This cold water is used to pre-cool the incoming air of a succeeding stage, allowing the cooling tower of the succeeding stage to produce cooler water than was possible in the preceding stage. In some embodients, this cascading of one cooling tower after another with a lower stage bolstering the cooling ability of a higher stage continues, giving cooling systems with 3, 4, 5, or more successive stages, each stage capable of producing cold water at successively colder temperatures.

MECS operation begins with a command from the central computer of the energy management system and from the local programmable logic controller. The operation of the MECS takes place in the following sequential steps:

Step-1

The fan 655 of the first cooling tower 601 starts, using a slow start method. Water circulating pump 60 starts, using a slow start method. The pump 60 takes cold water from the cold-water reservoir 20 and directs the water to pre-cooling coil (air-to-water heat exchanger 230) installed at the ambient air intakes of another cooling tower(s), respectively. Water, warmed by pre-cooling coils, returns to the source cooling tower and distributes the water evenly over the top of cooling tower fill, positioning it for continuing the evaporative cooling cycle.

Step-2

The fan 655' in the second cooling tower 601' starts, using a slow start method. The water circulating pump 60' starts, using a slow start method. The pump 60' takes cold water from cold-water reservoir 20' and directs the water to pre-cooling coil (air-to-water heat exchanger 230') installed at the ambient air intakes of the next stage cooling tower 601". Warmed water from the pre-cooling coil returns to the source cooling tower 601' and distributes the water evenly over the top of the fill of the cooling tower for continuing the evaporative cooling cycle.

Step-3

The fan 655" of the third cooling tower 601" starts, using a slow start method. The water circulating pump 60" starts, using a slow start method. The pump 60" takes cold water from the cold-water reservoir 20" and directs the water) pre-cooling coil (air-to-water heat exchanger 740') installed in the makeup air-handling unit 715. The warm water from the pre-cooling coil returns to the source cooling tower 601' and distributes the water evenly over the top of the fill for continuing the evaporative cooling cycle.

Due to the heat-mass transfer process taking place in the fill of all cooling towers, part of the water over the cooling tower fill evaporates and this evaporation process lowers the temperature of the remaining water that is falling through the cooling tower and collected in the cold-water reservoirs. The dry bulb temperature of ambient air entering into the pre-cooling coils is higher than the temperature of the cooling coil cooling water. The pre-cooling coils extract some amount of heat from the ambient air and, as a result, the dry bulb and wet bulb temperatures of the ambient air falls (is lowered). The calculations for the embodiment assume approach temperatures for cooling towers 2° F., and approach temperatures for pre-cooling coils 3° F.

These approach temperatures have been selected as illustrative examples only for the exemplary system described herein. Other approach temperatures may be applied that will provide a varying degree of results. The cooling towers may have approach temperatures that are different from one another or that are the same. Pre-cooling coils may have approach temperatures that are different from one another or that are the same.

Step-4

Supply fan 735 of makeup air-handling unit 715 starts, using a slow start method.

Step-5

The RA exhaust fan of the RA Sub System starts, using the slow start method.

Step-6

After the cooling system achieves the desired cold air supply from the makeup air-handling unit and achieves the desired temperature for the air leaving the pre-cooling coil, the control system, based on established parameters, activates the humidifier 730 at its minimum capacity and gradually adjusts its humidification capacity to humidify air as set out in the specific design specifications of the application for the conditioned space.

Step-7

After the cooling system achieves the desired cold air supply from the makeup air-handling unit 715, the control system adjusts and regulates the return air fan to meet the desired volume of return air.

Step-8

After the supply and return airflows are balanced as desired, the control system activates the humidifier in the RA Sub System at its minimum capacity and gradually adjusts its humidification capacity until it optimizes the humidification level to provide the lowest possible temperature of the return air stream. Lower air stream temperatures at this point provide maximum pre-cooling of ambient air in the air-to-air heat exchanger.

Example 2

The following estimates show cold water temperatures leaving the cooling towers for a cooling system design based on summer ambient air conditions for Phoenix, Ariz., and according to the MECS (cooling system) design. Since ASHRAE-specified design ambient air parameters for Phoenix, Ariz., for evaporation applications for 0.4% are 76.1° F. WB and 96.4° F. MCDB (evaporative application) exist at peak conditions for only a very short cooling time, these analysis and calculations focus on the ASHRAE Cooling Application corresponding to ambient air parameters for Phoenix, Ariz., of 110.2° F. DB and 70.0° F. WB temperatures. These parameters approximate some of the least favorable conditions for using evaporative cooling systems in Phoenix.

The estimated theoretical temperatures of cold water exiting any cooling tower with a design approach temperature of 2° F. operating at the design ambient air conditions of 76.1° F. WB and 96.4° F. MCDB (evaporative application) without using pre-cooling oils is approximately 78.1° F.

The estimated theoretical temperatures of cold water exiting a similarly designed cooling tower operating while not using a pre-cooling coil and cooling towers operating while using pre-cooling coils at the design ambient air conditions of 76.1° F. WB and 96.4° F. MCDB (evaporative application) are approximately 78.1° F., 73.6° F. and 72.6° F., respectively.

The estimated theoretical temperatures of cold water exiting any cooling tower with a design approach temperature of 2° F. (operating without pre-cooling coils) at the design ambient air conditions of 110° F. DB and 70° F. WB (cooling application) is approximately 72° F.

The estimated theoretical temperatures of cold water exiting a similarly designed cooling tower operating while not using a pre-cooling coil and second and third stage cooling towers operating while using pre-cooling coils at the design ambient air conditions of 110° F. DB and 70° F. WB (cooling application) are approximately 72° F., 60.2° F. and 55.5° F., respectively.

The design approach temperature for all the cooling towers is 2° F. The design approach temperature for all cooling coils in this calculation is 3° F. But approach temperatures may change to meet specific cooling design applications for specific locations and design parameters and will result in varying cooling results.

It should be noted that the estimated temperature values of cold water shown above for the cooling and evaporative applications does not include the pre-cooling of ambient air in the cooling coil located at the air intake of the first cooling tower. If the MECS design includes the cooling effect of the cooling coil, the water temperatures leaving the next stage cooling towers would be lower.

Sequential Cold Water Temperature Chain of the MECS Water Cooling Stages

The temperature of cold water exiting the third cooling tower is approximately 55.5° F., lower than the temperature of cold water exiting the second cooling tower, and the temperature of cold water exiting the second cooling tower is approximately 60.2° F., lower than the temperature of cold water exiting the first cooling tower, which is approximately 72° F. Another means of stating the above is that the temperature of cold water exiting cooling towers is that the third cooling tower is approximately 55.5° F. which is less than the second cooling tower of approximately 60.2° F. which is less than the first cooling tower of approximately 72° F. In this design example, the initial ambient air wet bulb temperature is 70° F. Therefore, in this example, an invention cooling system provides evaporatively cooled cold water exiting the final cooling tower at approximately 55.5° F., which is lower than the 70° F. initial wet bulb temperature of the ambient air.

Some invention cooling systems achieve these effects using various methods and systems consisting of the following:

Pre-cooling the ambient air entering into the cooling tower(s) with cooling coil(s) to provide sensible cooling of the entering air for lowering the ambient air's dry bulb and wet bulb temperatures.

If more than one cooling tower is arranged in series (cascaded) to meet a specific application, cold water from a first stage cooling tower is supplied to the cooling coil of the second cooling tower and to other optional cooling loads. Cold water from a second stage cooling tower is supplied to the coiling coil to a third or subsequent stage cooling towers and to other optional cooling loads. Cold water from a second, third, or greater stage is supplied to the cooling coil in the makeup air-handling unit and may be supplied to other optional cooling loads.

For the specific local design conditions and specific cooling application, the piping system configuration supplying cold water or cold air to the air or water cooling loads can be modified to provide flexibility in operating any combination of cooling towers.

In all cases, invention methods of arranging the cooling towers in a series/cascade providing for the operation of the cooling tower combinations using special direct/indirect evaporation techniques is able to generate cold water with a final temperature lower than the initial wet bulb temperature of ambient air. The temperature of cold water generated by MECS can be used to satisfy a majority of HVAC and process cooling applications while using significantly lower energy as compared to conventional mechanical refrigeration systems.

Air Cooling Stages

The makeup air-handling unit cools the makeup air for this particular application. The makeup air-handling unit comprises a pre-cooling coil providing sensible cooling (cooling stage-4) of the ambient air, an evaporative humidifier providing additional (if necessary) adiabatic cooling of the makeup air (cooling stage-5), and either an air-to-air heat exchanger (cooling stage-7) or air-mixing section or both use the return air from the conditioned space.

Cooling Stage-4 (Makeup Air Cooling)

The makeup air-handling unit fan pulls the required amount of the makeup (ambient) air into the makeup air-handling unit housing through the air intake louver. The air then passes through the air filter section, the air-to-air heat exchanger section, and enters into the pre-cooling coil, which cools makeup air using cold water supplied from cooling tower. (Note. At this point, it is not assumed that an air-to-air heat exchanger is incorporated thereby facilitating the next statement.) Air enters pre-cooling coil at conditions of 110.2° F. DB and 70° F. WB temperature and leaves pre-cooling coil at approximately 58.5° F. DB and 51.5° F. WB temperature. The sensible cooling load for pre-cooling coil for a cooling application described herein is approximately 168.0 tons of equivalent refrigeration.

Note: For demonstration of the available cooling capacity of the MECS, we do not take into consideration the heat rejected from the ambient air stream by pre-cooling the return air stream the air-to-air heat exchanger.

Cooling Stage-5 (Makeup Air Cooling)

Cooling Stage-5 further increases cooling capacity of the cooled supply air, reducing its dry bulb temperature by means of adiabatic cooling of an ambient air coming through the pre-cooling coil. Cooling Stage-5 comprises an evaporative air humidifier installed in the makeup air-handling unit housing downstream of the supply air fan. The adiabatic cooling capacity of cooling stage-5 is approximately 96,485 BTU/hr or 8 tons of equivalent refrigeration. The humidifier could be either a high-pressure water dispersion type or any other type of evaporative humidifier appropriate for the application. The integrated part of the cooling stage-5 is a mist eliminator situated downstream of the humidifier. The parameters of the supply air leaving cooling stage 5 and entering into the conditioned space are approximately 51.8° F. DB and 51.3° F. WB at the total supply airflow rate of approximately 35,000 CFM (air mass flow is equivalent to 160,809 lbs/hr). Assuming a condition space temperature of 80° F. DB, the assimilating sensible cooling capacity of the supply air is approximately 92 tons of equivalent refrigeration.

Cooling Stage-6 (Return Air Cooling)

The air cooling stage-6 provides the high-efficiency adiabatic cooling of the RA stream to reduce its temperature as low as possible before its heat exchange interaction with the warm ambient air stream in the air-to-air heat exchanger which is part of cooling stage-7. This air cooling stage-6 is a part of the RA Sub-System, combining the RA ductwork, evaporative air humidification chamber, and the air-to-air heat exchanger physically located in the makeup air-handling unit housing. The humidification chamber comprises the humidifier, which could be either a high-pressure water dispersion type or any other appropriate type of evaporative humidifier matching the application. The integrated part of cooling stage-6 is a mist eliminator situated downstream of the humidifier in the humidification chamber.

Cooling Stage-7 (Makeup Air Cooling)

Cooling Stage-7 allows significant reduction in the total energy usage by the MECS, especially at peak conditions, by pre-cooling ambient air using the lower temperature return air from the conditioned space. In our case, the estimated temperature of the adiabatically cooled RA entering the air-to-air heat exchanger could be within approximately 75-76° F. DB range while the temperature of ambient air entering the air-to-air heat exchanger is 110.2° F. DB. The anticipated heat transfer efficiency of the heat exchanger with the above interacting airstreams is approximately 70%.

Cooling Stage-7 consists of an air-to-air heat exchanger situated at ambient air intake of the makeup air-handling unit, RA exhaust fan, and RA ductwork. The RA exhaust fan is installed at the strategic location-downstream of the air-to-air heat exchanger. This location of the RA exhaust fan makes the following positive energy impacts:

It increases the total amount of heat extracted from the warm ambient air stream by eliminating the fan heat going to the RA stream resulting in the production of cooler makeup air entering into pre-cooling coil and reducing the cooling load on the pre-cooling coil.

It decreases the required amount of cold water used by pre-cooling coil, and reduces the energy consumption of all the operating cooling towers and their respective water circulating pump(s).

The makeup air-handling unit of the MECS supplies into the conditioned space approximately 35,000 CFM of cooled air at the estimated parameters of 51.8° F. DB and 51.3° F. WB. The initial design parameters of ambient air entering into the makeup air-handling unit are 110.2° F. DB and 70° F. WB temperatures. The indoor air design parameters for the conditioned space are approximately 80° F. DB and 62.3° F. WB temperatures. The cooling capacities of the air cooling stages of the makeup air-handling unit are:

Air Cooling Stage-4 168 tons of equivalent refrigeration.
Air Cooling Stage-5 (sensible equivalent adiabatic cooling) 8 tons of equivalent refrigeration.

The total gross air cooling capacity of the makeup air-handling unit in this example is approximately 176 tons of equivalent refrigeration. The total sensible cooling load for cooling 160,809 lbs/hr of ambient air mass at initial temperatures of 110.2° F. DB and 70° F. WB to supply air temperatures of 51.8° F. DB and 51.3° F. WB is approximately 170 tons of equivalent refrigeration. Therefore, to cool specified amounts of ambient air from the initial design parameters to the specified parameters of the supply requires a net of approximately 170 tons of equivalent refrigeration.

35,000 CFM (mass flow rate 160,809 lbs/hr) of supply air at approximate conditions of 51.8° F. DB and 51.3° F. WB temperatures can provide specified indoor air conditions of 80° F. DB and relative humidity of 62.3% in the conditioned space. The corresponding net sensible cooling capacity of the cold supply air is approximately 92 tons of equivalent refrigeration.

Note: The design parameters of the return air exiting the conditioned space and entering into RA Sub-System are approximately 80° F. DB and 62.3° F. WB temperatures.

While particular embodiments of the present invention have been shown and described, it will be obvious to those skilled in the art that changes and modifications can be made without departing from the embodiments of this invention in its broader aspects and, therefore, the appended claims are to encompass within their scope all such changes and modifications as fall within the true, intended, explained, disclose, and understood scope and spirit of this invention's multitudinous embodiments and alternative descriptions.

Additionally, various embodiments have been described above. For convenience's sake, combinations of aspects composing invention embodiments have been listed in such a way that one of ordinary skill in the art may read them exclusive of each other when they are not necessarily intended to be exclusive. But a recitation of an aspect for one embodiment is meant to disclose its use in all embodiments in which that aspect can be incorporated without undue experimentation. In like manner, a recitation of an aspect as composing part of an embodiment is a tacit recognition that a supplementary embodiment exists that specifically excludes that aspect. All patents, test procedures, and other documents cited in this specification are fully incorporated by reference to the extent that this material is consistent with this specification and for all jurisdictions in which such incorporation is permitted.

Moreover, some embodiments recite ranges. When this is done, it is meant to disclose the ranges as a range, and to disclose each and every point within the range, including end points. For those embodiments that disclose a specific value or condition for an aspect, supplementary embodiments exist that are otherwise identical, but that specifically exclude the value or the conditions for the aspect.

What is claimed is:

1. A cooling system comprising:
   a first-stage cooling assembly that comprises a forced-draft cooling tower having:
      an ambient air inlet,
      an air outlet,
      a cooling fluid reservoir disposed at a bottom of the first-stage cooling tower,
      a variable speed fan disposed adjacent to the first-stage air outlet, dedicated to the first-stage cooling tower, and configured to variably control air flow through the first-stage cooling tower, and
      a variable flow water pump; and
   a final-stage cooling assembly that comprises a forced-draft cooling tower having:
      an air inlet,
      an air outlet,
      a cooling fluid reservoir disposed at a bottom of the final-stage cooling tower,
      a variable speed fan disposed adjacent to the final-stage air outlet, dedicated to the final-stage cooling tower, and configured to variably control air flow through the final-stage cooling tower,
      a final-stage cooling load heat exchanger at the air inlet of the final-stage cooling tower, and
      a variable flow water pump that is adapted to pump cooling fluid through final-stage supply piping; wherein
   the first-stage variable flow water pump pumps cooling fluid from the first-stage cooling fluid reservoir through the first-stage supply piping to, and the cooling fluid from the first stage-cooling tower is in indirect heat exchange relationship with, two or more of the following heat exchangers:
      the final-stage cooling load heat exchanger serving the air inlet of the final-stage cooling tower;
      an intermediate-stage cooling load heat exchanger serving an air inlet of an optional intermediate-stage cooling tower; or
      a heat exchanger serving a third cooling load other than the intermediate-stage cooling load or final-stage cooling load heat exchangers; and
   warmed fluid is returned directly to wet media of the first-stage cooling tower and then upon being cooled flows down into the first-stage cooling fluid reservoir for reuse, and
   the final-stage variable flow water pump pumps cooling fluid from the final-stage cooling fluid reservoir through the final-stage supply piping to a heat exchanger serving a final cooling load and warmed fluid is returned directly to wet media of the final-stage cooling tower and then upon being cooled flows down into the final-stage cooling fluid reservoir for reuse and
   the cooling fluid from the final-stage cooling tower is in indirect heat exchange relationship with the heat exchanger serving the final cooling load, but
   the first-stage variable flow water pump does not circulate cooling fluid to an air-to-water heat exchanger servicing the ambient air inlet of the first-stage cooling tower.

2. The cooling system of claim 1 additionally comprising:
   an intermediate-stage cooling assembly that comprises a forced-draft cooling tower having:
      an air inlet,
      an air outlet,
      a cooling fluid reservoir disposed at a bottom of the intermediate-stage cooling tower,
      a variable speed fan disposed adjacent to the intermediate-stage air outlet, dedicated to the intermediate-stage cooling tower, and configured to variably control air flow through the intermediate-stage cooling tower,
      an intermediate-stage cooling load heat exchanger at the air inlet of the intermediate-stage cooling tower, and
      a variable flow water pump that is adapted to pump cooling fluid through intermediate-stage supply piping; wherein
   the intermediate-stage variable flow water pump pumps cooling fluid from the intermediate-stage cooling fluid reservoir through the intermediate-stage supply piping to, and the cooling fluid from the intermediate stage-cooling tower is in indirect heat exchange relationship with, two or more of the following heat exchangers:
      the final-stage cooling load heat exchanger serving the air inlet of the final-stage cooling tower;
      a second, intermediate-stage cooling load heat exchanger serving the air inlet of another optional intermediate-stage cooling tower; or
      a heat exchanger serving a fourth cooling load other than the intermediate-stage or final-stage air inlet heat exchangers; and
   warmed fluid is returned directly to wet media of the intermediate-stage cooling tower and then upon being cooled flows down into the intermediate-stage cooling fluid reservoir for reuse.

3. The cooling system of claim 1 wherein the final-stage cooling tower further comprises an energy recovery system connected to the cooling tower air outlet.

4. The device of claim 3 wherein the intermediate-stage cooling tower further comprises an energy recovery system connected to the cooling tower air outlet.

5. The device of claim 3 wherein the energy recovery system comprises a closed cooling loop that comprises a heat exchanger and a cooling load.

6. The device of claim 4 wherein the energy recovery system comprises a closed cooling loop that comprises a heat exchanger and a cooling load.

* * * * *